2,831,780
METHOD FOR IMPROVING THE SCRATCH RESISTANCE AND STRENGTH OF GLASS ARTICLES

Alden J. Deyrup, Niagara Falls, N. Y., assignor to E. I. du Pont de Nemours and Company, Wilmington, Del., a corporation of Delaware No Drawing. Application April 21, 1955
Serial No. 503,010

6 Claims. (Cl. 117—54)

This invention relates to a method for improving the scratch resistance and strength of glass articles.

The glass container industry has reduced the weight of glass bottles as far as practical in order to reduce cost and shipping weight. Further reduction in weight would be desirable but has not been accomplished because of the strength limitations of glass. The limit is not absolute strength but practical strength of freshly scratched glass. It has been said that an average bottle loses about 75% of its bursting strength by rubbing contacts with other bottles. There is also a substantial field for improvement in flat window glass where scratches incurred in transit and from glass fragments on the retailer's cutting bench increase rejects and waste. Also, glass fibers for textiles are weakened by abrasion of one fiber by another.

Sulfur dioxide and lubricant sprays have been used to minimize strength loss due to scratching within the bottle plant, but such treatments have no major lasting effect. Other ways have been proposed and used but have been relatively ineffective or impractical for various reasons.

It is an object of the invention to provide a method for increasing the scratch resistance and practical strength of glass articles. A further object is to provide a method for increasing the scratch resistance and strength of glass articles without changing substantially their appearance. Still further objects will be apparent from the following description.

The objects of the invention are accomplished by treating a glass article or surface while at a temperature in the range from about the strain temperature of the glass, i. e. the lowest temperature at which strains can be practically relieved by annealing, up to the deformation temperature of the glass, i. e. up to just below the minimum temperature at which excessive deformation of the article will occur in the time of the treatment, with the vapor of a metallo-organic compound which will pyrolyze in contact with glass at the above treating temperature to form one or more metal oxides melting (or subliming) at a temperature above the melting point for $SiO_2$ (M. P., 1710° C.). The metallo-organic compound should be sufficiently volatile at some temperature without excessive decomposition to exert an appreciable vapor pressure, i. e., at least 0.1 mm. Hg vapor pressure.

It has been found that when glass is treated under the conditions indicated, pyrolysis of the vaporous metallo-organic compound on the glass surfaces produces an adherent refractory metal oxide coating on the glass surface. This coating increases substantially the scratch resistance of the surface and, therefore, the practical strength of the glass article.

The treatment is preferably effected while the glass article is at a temperature in or about the annealing temperature range for the glass, generally within the range 450 to 600° C. It is preferred to carry out the treatment so as to deposit an oxide coating of a thickness ranging from about 10 to 100 millimicrons. Coatings of such thickness give best scratch resistance without iridescent colors. Scratch resistance decreases as the coating thickness is either decreased or increased with respect to the above range. Worthwhile improvement in scratch resistance generally is not realized at coating thicknesses below about 5 millimicrons or above about 2000 millimicrons.

Another way to carry out the invention is to treat the glass with the vapor of the metallo-organic compound at a temperature somewhat below the annealing range but high enough to pyrolyze the compound, and then subsequently heat the glass article to the annealing range, with or without intermediate cooling. Treatment in this manner is effective, but the procedure in which the entire treatment is effected in the annealing range is preferred because it is simpler. However, the two-temperature treatment may be preferred in some instances where very close control of coating thickness is desired.

Any metallo-organic compound whose vapors are pyrolyzed by contact with a glass surface at a temperature in the indicated range to give an oxide having a melting or sublimation temperature higher than the melting temperature of $SiO_2$ is usable in practicing the invention, provided also that the compound is sufficiently volatile to exert a substantial vapor pressure without excessive decomposition prior to contact with the hot glass article. The volatile metallo-organic compounds of aluminum, titanium and zirconium fall in this class. Specific examples are aluminum ethoxide, aluminum isopropoxide (tri-isopropyl aluminate), tetra-isopropyl titanate and tetra-t-butyl zirconate. Inorganic compounds are generally either too heat stable or not sufficiently volatile without decomposition to be suitable for the present purposes.

The concentration of vapors of the metallo-organic compound in the treating gas mixture is not critical. Ordinarily, a concentration corresponding to a partial pressure of at least 0.1 mm. Hg will be desirable, concentrations corresponding to partial pressures of about 0.1 to 50 mm. Hg being generally practical. Higher concentrations, e. g., up to 100% can be used but usually will be less practical. The vapors can be diluted with any inert carrier gas such as nitrogen, methane or air, the latter being preferred for cost reasons. Surprisingly, when air is used as the carrier gas, the diluted vapors of the treating compound are not burned by the air to smoke or dust in the hot surroundings of the glass being treated, but deposit on the glass just as well from air as from pure nitrogen. The carrier gas is preferably used in dry condition so as to avoid hydrolysis of the metallo-organic compound.

The invention is illustrated by the following examples.

Example 1

A clean glass test strip was positioned in a tubular chamber surrounded by a furnace. When the strip was at a temperature of 550° C., as determined by a pyrometer, a stream of a mixture of nitrogen and aluminum isopropoxide vapors was passed through the chamber containing the test strip. This gas mixture was prepared by saturating a stream of nitrogen with aluminum isopropoxide vapors at 90° C. and diluting the resulting mixture with nitrogen at a ratio of 1 to 19 by volume.

After 10 minutes contact of the glass strip with the treating gas mixture, the strip was permitted to cool. The treatment formed on the strip an adherent coating of aluminum oxide about 50–100 millimicrons thick. This coating increased substantially the resistance of the glass strip to scratching by a sharp pointed piece of glass.

Example 2

The procedure of Example 1 was repeated using tetra-isopropyl titanate vaporized at 75° C. in place of aluminum isopropoxide to obtain a glass test piece having a titanium oxide coating about 50–100 millimicrons thick. In this case the saturated nitrogen was diluted with 7.9 volumes to 1 of additional nitrogen. The treated glass strip was even more resistant to scratching than was the product of Example 1.

*Example 3*

The procedure of Example 1 was repeated using tetra-t-butyl zirconate vaporized at 100° C. as the metallo-organic compound. The saturated nitrogen was diluted to one twentieth with additional nitrogen. The treated test piece having a thin coating of zirconium oxide was substantially more scratch resistant than was the untreated glass.

*Example 4*

The procedure of Example 2 was repeated, using dry air in place of nitrogen, with substantially identical results.

*Example 5*

The procedure of Example 2 was repeated except that the temperature of the glass when contacted with the treating gas mixture was 350° C., and the glass strip was subsequently heated to 550° C. for 10 minutes. Results were substantially the same as those obtained in Example 2.

Scratch resistant composite alumina-titania and titania-silica coatings have been prepared in similar ways by employing treating gas mixtures containing vapors of two appropriate metallo-organic compounds. The composite alumina-titania coatings were intermediate between alumina and titania coatings as regards scratch resistance, while the composite titania-silica coatings were somewhat inferior to titania films. Other composite scratch resistant coatings can be produced similarly by employing treating gas mixtures containing the vapors of two or more metallo-organic compounds which yield refractory metal oxides on pyrolysis, at least one of said compounds yielding on pyrolysis a metal oxide which melts or sublimes at a temperature above the melting point of $SiO_2$.

Silica coatings, applied in a similar manner from vapors of ethyl orthosilicate, produced no detectable change in scratch resistance.

In order to avoid the need of separately reheating glass articles to a suitable temperature for application of the scratch resistant coating, it is preferred to integrate the present method with the usual glass forming and annealing operations. Thus, the hot glass article after the forming operation and before completion of annealing would be contacted for the required short time, with a suitable gas mixture containing the vapors of one or more metallo-organic treating agents, to obtain directly glass articles of improved scratch resistance and strength. In general, contact times of a few seconds, e. g., 10 to 30 seconds, are adequate, but shorter or longer times, e. g., up to 20 minutes or longer, may be desirable in some cases depending upon various factors such as the coating thickness desired, the vapor concentration of the metallo-organic compound in the treating gas, and convenience in operation.

I claim:

1. A method for increasing the scratch resistance of a glass surface comprising treating said surface while at a temperature between the strain temperature and the deforming temperature of the glass with the vapor of a metallo-organic ester selected from the group consisting of alkyl titanates, alkyl zirconates, alkyl aluminates, and mixtures thereof which pyrolyzes to form a metal oxide coating on the glass surface.

2. The method of claim 1 wherein the article is at a temperature within the annealing range of the glass.

3. The method of claim 1 wherein the article is at a temperature within the range 450 to 600° C.

4. The method of claim 1 wherein the metallo-organic ester is aluminum isopropoxide.

5. The method of claim 1 wherein the metallo-organic ester is tetra-isopropyl titanate.

6. The method of claim 1 wherein the metallo-organic ester is tetra-t-butyl zirconate.

References Cited in the file of this patent

UNITED STATES PATENTS

| | | |
|---|---|---|
| 2,430,994 | Reynolds | July 29, 1944 |
| 2,478,817 | Gaiser | Aug. 9, 1949 |
| 2,614,944 | Lytle | Oct. 21, 1952 |

FOREIGN PATENTS

| | | |
|---|---|---|
| 125,450 | Australia | Sept. 25, 1947 |